Dec. 2, 1924.                                                          1,517,544
E. R. DRAVER
MEANS FOR COUPLING TELESCOPED TUBULAR MEMBERS
Filed Feb. 2, 1922          2 Sheets-Sheet 1
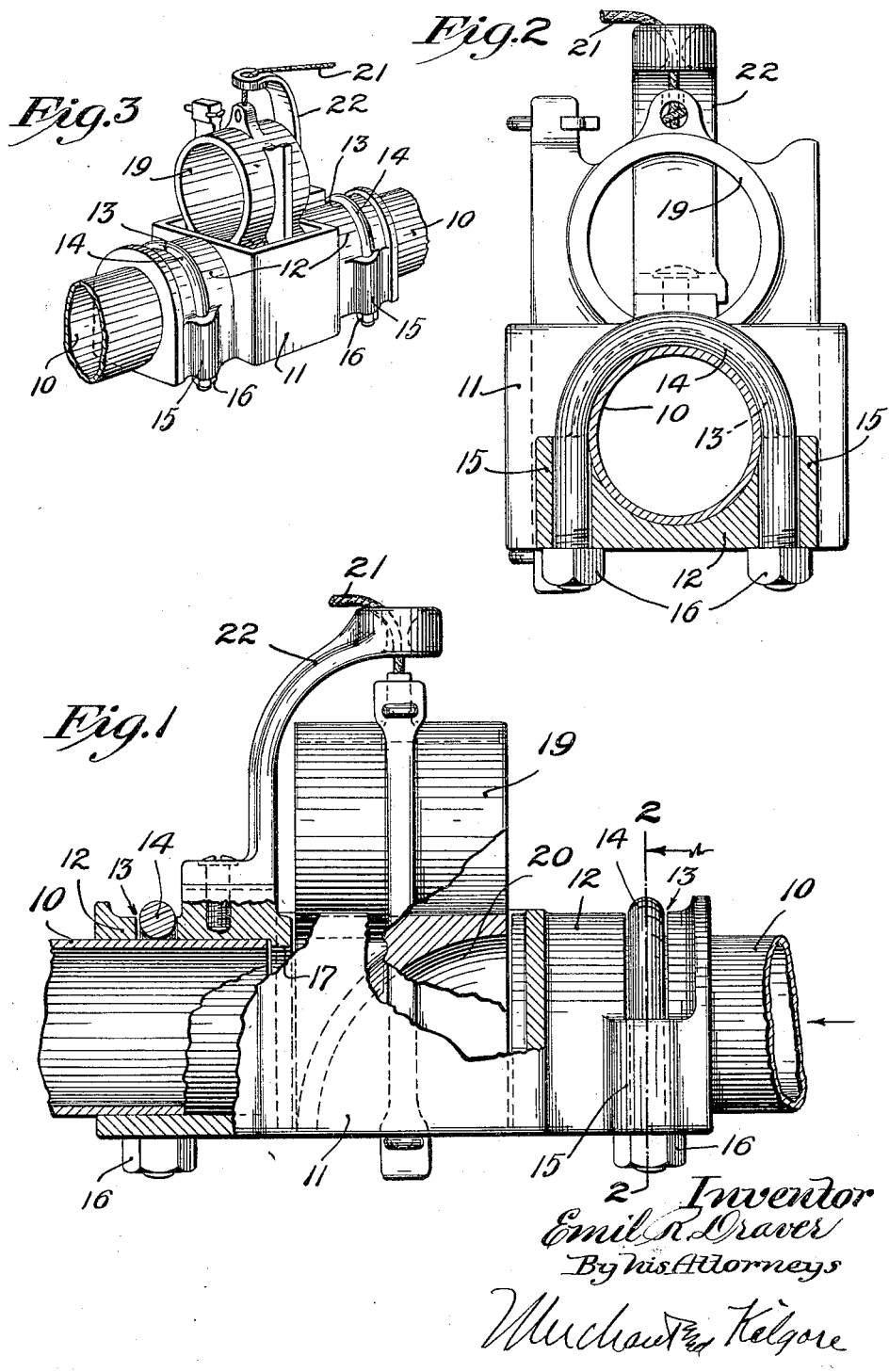

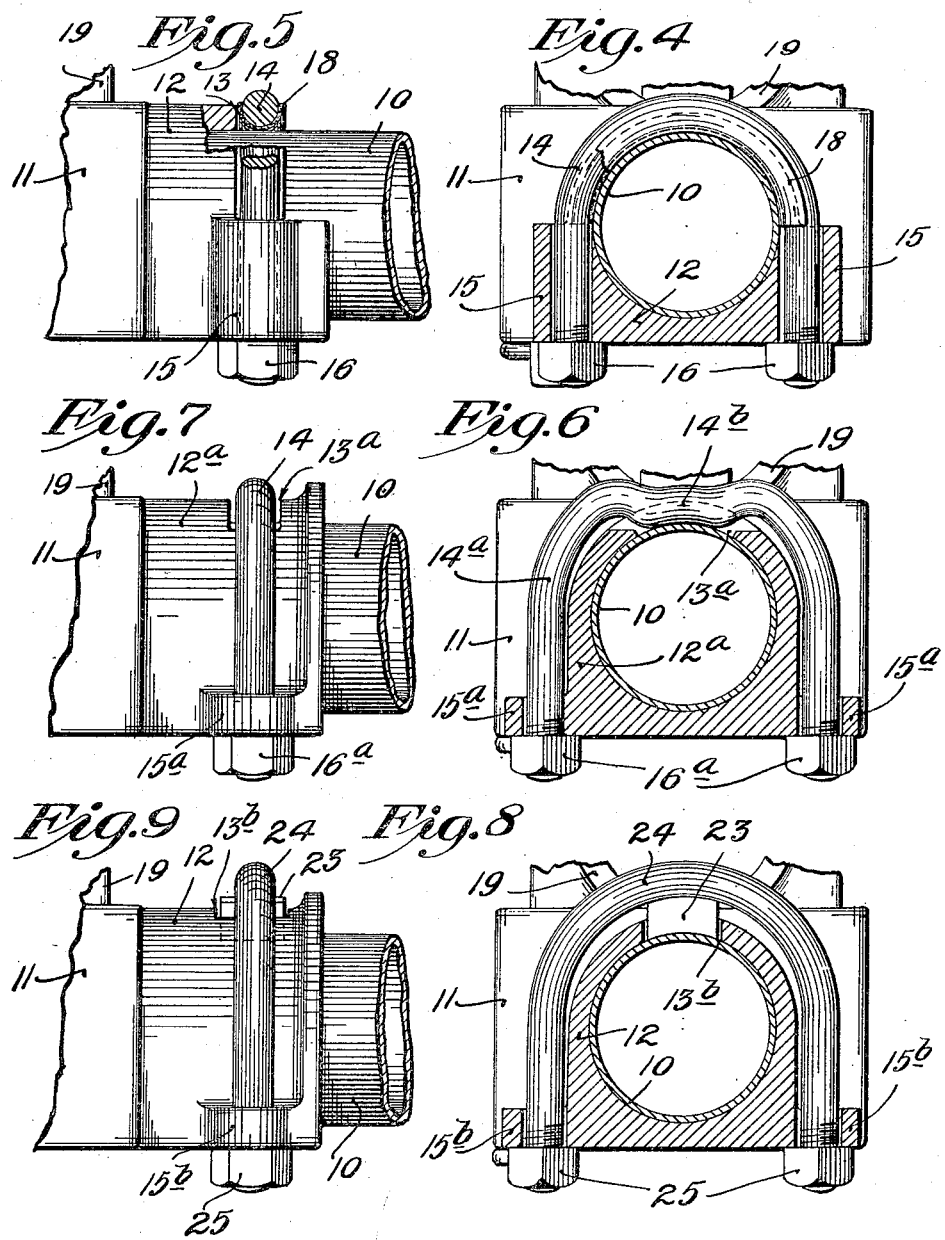

Patented Dec. 2, 1924.

1,517,544

UNITED STATES PATENT OFFICE.

EMIL R. DRAVER, OF RICHMOND, INDIANA.

MEANS FOR COUPLING TELESCOPED TUBULAR MEMBERS.

Application filed February 2, 1922. Serial No. 533,576.

*To all whom it may concern:*

Be it known that I, EMIL R. DRAVER, a citizen of the United States, residing at Richmond, in the county of Wayne and State of Indiana, have invented certain new and useful Improvements in Means for Coupling Telescoped Tubular Members; and I do hereby declare the following to be a full, clear, and exact description of the invention, such as will enable others skilled in the art to which it appertains to make and use the same.

Broadly, my invention provides an improvement in means for connecting telescoped tubular members but is particularly adapted for use to connect exhaust cut-outs to exhaust pipes and exhaust pipes to exhaust manifolds. Generally stated, the invention consists of the novel devices, construction and arrangement of parts hereinafter described and defined in the claims.

In the accompanying drawings, which illustrate the invention, like characters indicate like parts throughout the several views.

Referring to the drawings:

Fig. 1 is an elevation showing an exhaust cut-out of the type particularly disclosed and claimed in my pending application 499,193, filed of date Sept. 8, 1921, and entitled "Exhaust cut-out," and illustrating my present invention incorporated therein, some parts being broken away and some parts being sectioned;

Fig. 2 is a transverse vertical section on the line 2—2 of Fig. 1;

Fig. 3 is a perspective showing the cut-out applied in an exhaust pipe;

Fig. 4 is a view corresponding to Fig. 2, but with some parts broken away and illustrating a modified construction and packing strip in connection with a U-bolt or clip;

Fig. 5 is a fragmentary side elevation of the parts shown in Fig. 4;

Fig. 6 is a view corresponding to Fig. 4, but illustrating a modified form of the U-bolt or clip;

Fig. 7 is a fragmentary side elevation of the parts shown in Fig. 6;

Fig. 8 is another view corresponding to Fig. 4, but illustrating a still further modification of the U-bolt or clip; and Fig. 9 is a side elevation of the parts shown in Fig. 8.

Describing first the construction illustrated in Figs. 1, 2 and 3, the numeral 10 indicates an exhaust pipe which has been sectioned or cut in two and its severed ends axially separated to form a gap. In the construction illustrated, this gap is spanned by a rectangular yoke 11 open at top and bottom and provided with axially aligned sleeves 12 into which the severed ends of the exhaust pipe are telescoped. Both the inner and outer extremities of these sleeves are circumferentially complete, but at their intermediate portions are formed with approximately semi-circular, circumferential slots 13 that receive the bowed portions of U-shaped clamping bolts or clips 14, the ends of which are extended through outstanding lugs 15 formed on the sides of the sleeves in the transverse planes of the slots. The projecting threaded ends of the U-bolts 14 are provided with nuts 16 which, when tightened against the lugs 15, tightly clamp the U-bolts against the pipe sections 10 and tightly seat the latter in the bottoms of the sleeves. At their inner extremities, the sleeves 12 are shown as provided wih internal stop shoulders 17 that prevent the pipe sections from being telescoped completely through said sleeves.

The stop shoulder 17 not only forms a stop for the pipe sections, but when the pipe sections are assembled, there will be formed tight joints for preventing leakage of the exhaust gases, and when the nuts of the U-bolts are tightened, then close engagement will be maintained because the pipe sections can then neither rotate or slip axially within the sleeves.

In practice, the pipe sections cannot be made to very snugly fit within the sleeve and, hence, when they are clamped down within the sleeves by the U-bolts, there will be some space at the tops thereof through which exhaust gases might escape. To prevent this, packing strips 18, preferably of asbestos paper, such as shown in Figs. 4 and 5, may be interposed in the slots 13 between the U-bolts and the pipe sections. It is thus evident that when the stop shoulder and packing are both employed as above described, tight joints will be formed at both places to prevent leakage of the exhaust gases or other fluid at such places.

The movable element of the cut-out device may take various different forms, but, as shown, it is of the type disclosed in my said application No. 499,193, and comprises a supplemental pipe section 19 provided with a depending exhaust deflector 20. Said parts 19 and 20 work vertically within the yoke 11 and are movable alternately into alignment with the exhaust pipe under the action of a small cable 21 that works through the eye of a guide bracket 22 secured on one of the sleeves 12.

In the construction illustrated in Figs. 4 and 5, the opening in the sleeve 12 is in the form of a large approximately semi-circular notch that extends to the outer end of the sleeve, so that that portion of the sleeve that is aligned with but above the lugs 15 is removed.

In the modified construction illustrated in Figs. 6 and 7, the sleeve 12ª is provided in its top with but a short circumferential slot 13ª, and the U-bolt or clip 14ª, in its bow, is provided with a depressed portion 14ᵇ that works in said slot and is engageable with the top of the exhaust pipe 10. This U-bolt 14ª is provided at its threaded ends with nuts 16ª that engage lugs 15ª through which said bolt is passed.

In the construction illustrated in Figs. 8 and 9, the sleeve 12 is provided at its top with a rectangular perforation 13ᵇ in which is placed a clamping block 23. This clamping block 23 is tightly pressed onto the top of the exhaust pipe 10 by a U-bolt or clip 24, the ends of which are passed through lugs 15ᵇ on the sleeve 12. The threaded ends of said bolt 24 are provided with nuts 25 that are tightened against the lugs 15ᵇ.

In the construction illustrated in Figs. 8 and 9, the block 23, while not an integral part of the U-bolt, is, nevertheless, an operative part thereof and is within the meaning of the expression "a U-bolt provided with a part engageable with the pipe through the sleeve," as herein broadly used in the specification and in the claims. Not only is the coupling connection herein described and herein claimed of small cost, but in practice has been found highly efficient for the purposes had in view.

While the device described is especially adapted to span a gap formed in an exhaust pipe or the like and to rigidly connect the ends of the pipe sections, it is also adapted for more general use, regardless of whether or not the device has one or two sleeves and whether or not it is applied in the gap of a pipe or to couple one end thereof to a sleeve or hub.

What I claim is:

1. The combination with telescoped tubular members, of a nut-equipped U-bolt anchored to the outer tubular member and embracing the inner tubular member and clamping approximately one-half of the external surface of said inner tubular member into contact with substantially one-half of the inner surface of said outer tubular member, and a packing strip clamped by the bowed portion of said U-bolt against the inner tubular member and against the adjacent end portion of the outer tubular member.

2. The combination with telescoped tubular members, of a nut-equipped U-bolt anchored to the outer tubular member and embracing the inner tubular member and clamping approximately one-half of the external surface of said inner tubular member into contact with substantially one-half of the inner surface of said outer tubular member, and a packing strip clamped by the bowed portion of said U-bolt against the inner tubular member and against the adjacent end portion of the outer tubular member, said packing being extended approximately half-way around said inner tubular member on the side thereof that is away from that half that is drawn to its seat by said U-bolt.

3. The combination with telescoped tubular members, of a nut-equipped U-bolt anchored to the outer tubular member and embracing the inner tubular member and clamping approximately one-half of the external surface of said inner tubular member into contact with substantially one-half of the inner surface of said outer tubular member, and a packing strip clamped by the bowed portion of said U-bolt against the inner tubular member and against the adjacent end portion of the outer tubular member, the outer tubular member being cut away throughout approximately one-half of its circumference at the place where the bow of said U-bolt is located.

4. The combination with telescoped tubular members, of means applied thereto for pressing approximately one-half of the external surface of said inner tubular member against approximately one-half of the internal surface of said external tubular member, and an approximately semi-circular packing pressed by said clamping means against said internal and external tubular members and forming a tight joint between those halves of the two members that are opposite to the said portions that are directly clamped together.

5. The combination with telescoped tubular members, of a nut-equipped U-bolt anchored to one of said members and operative on the other member to clamp the two members together, and a packing strip clamped by the bowed portion of said U-bolt against said inner tubular member and against the adjacent end portion of said outer tubular member.

6. The combination with telescoped tubular members, of a U-bolt provided with nuts that react against the outer tubular member, said outer tubular member adjacent to the bow of the yoke having a portion removed to permit the bow of the yoke to engage the inner tubular member and clamp the same against said outer tubular member, and a packing strip clamped by the bowed portion of said U-bolt against said inner tubular member and against the adjacent end portion of said outer tubular member.

7. The combination with telescoped tubular members, said outer tubular member having outstanding lugs, of a nut-equipped U-bolt engaging said lugs and having at its bow a portion that engages the inner tubular member to clamp the same against said outer tubular member, and a packing strip clamped by the bowed portion of said U-bolt against said inner tubular member and against the adjacent end portion of said outer tubular member.

In testimony whereof I affix my signature.

EMIL R. DRAVER.